Jan. 20, 1925.
J. McFARLANE
1,523,552
OUTER CASING OR SHOE FOR PNEUMATIC TIRES
Filed Sept. 15, 1923
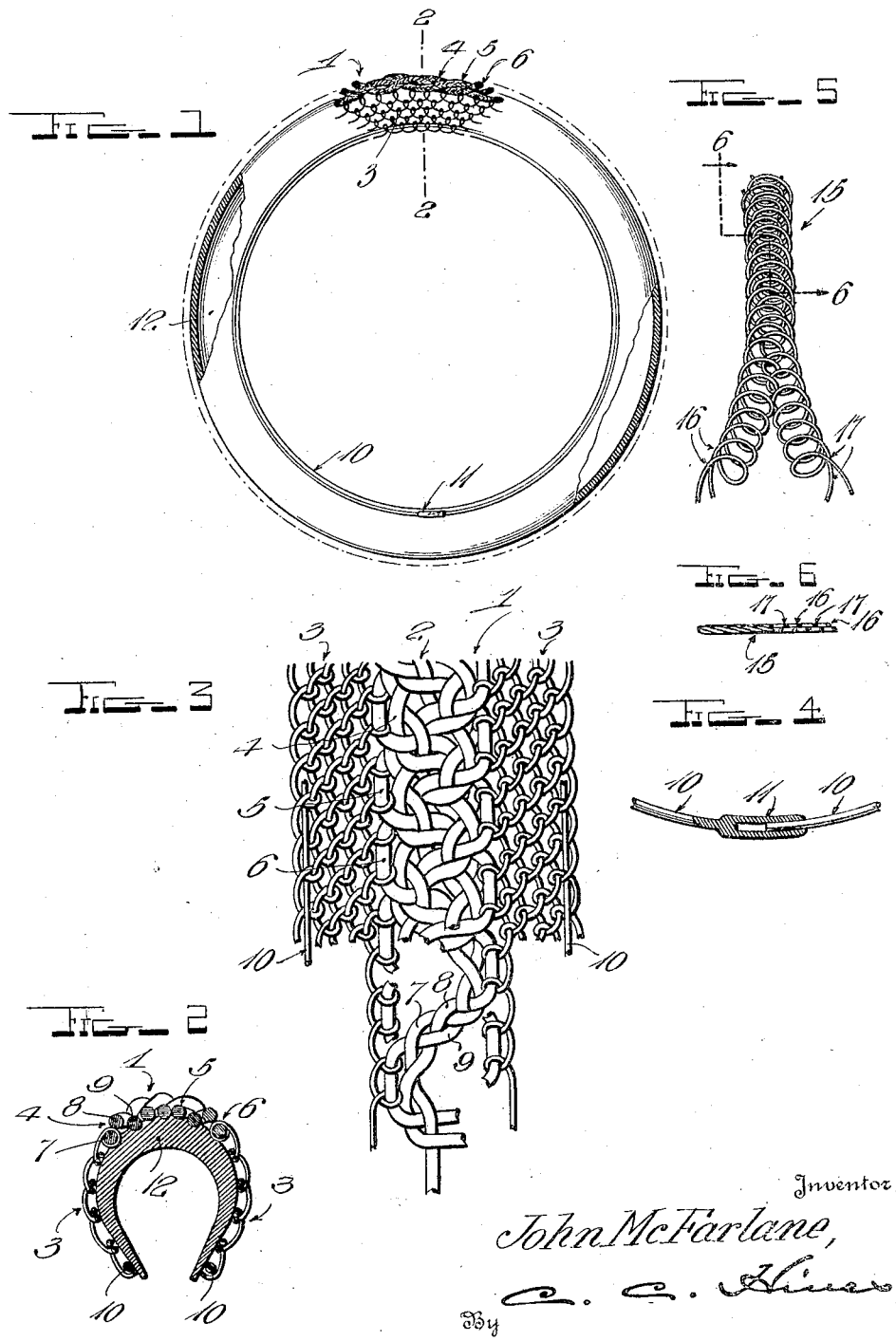

Patented Jan. 20, 1925.

1,523,552

UNITED STATES PATENT OFFICE.

JOHN McFARLANE, OF WASHINGTON, DISTRICT OF COLUMBIA, ASSIGNOR OF ONE-HALF TO WILLIAM BOYD WIGGINGTON, OF WASHINGTON, DISTRICT OF COLUMBIA.

OUTER CASING OR SHOE FOR PNEUMATIC TIRES.

Application filed September 15, 1923. Serial No. 662,984.

*To all whom it may concern:*

Be it known that I, JOHN McFARLANE, a citizen of the United States, residing at Washington, District of Columbia, have invented new and useful Improvements in Outer Casings or Shoes for Pneumatic Tires, of which the following is a specification.

This invention relates to certain new and useful improvements in outer casings or shoes for pneumatic tires, comprehending particularly the provision of an outer casing or shoe made of interlaced or woven strands of spring wire, whereby a type of outer casing or shoe is furnished which will have ample resiliency, with maximum durability and capacity for wear, which will be substantially proof against penetration by objects, thus protecting the inner tube from puncture, and which will at all times securely grip the street or road surface, thus obviating the necessity of employing anti-skid chains or other anti-skid devices.

A further object of the invention is to provide an outer shoe or casing of the type described which is of novel construction and in which the wire strands are interlaced or woven in a novel and peculiar manner, so as to secure maximum strength and durability with any desired and efficient range of resiliency or flexibility.

A still further object of the invention is to provide a woven steel tire casing or shoe having a tread portion formed of a plurality of plaited or interwoven units, each composed of a plurality of plaited or woven wires, and side portions formed of netted or woven strands of smaller gage than the tread surface wires, thus producing a tire casing or shoe possessing the characteristics stated and which at the same time will be of reasonably light weight.

A still further object of the invention is to provide a tire shoe or casing of the character described having an internal lining of a suitable material to enclose the inner tube and protect the same from wear.

With these and other objects in view, the invention consists of the features of construction, combination and arrangement of parts, hereinafter fully described and claimed, reference being had to the accompanying drawing, in which:—

Figure 1 is a view, shown partly in outline and partly in elevation and in section, of a woven wire tire shoe or casing embodying my invention.

Figure 2 is a cross-section on the line 2—2 of Figure 1.

Figure 3 is a plan view of a portion of the shoe or casing on an enlarged scale, showing clearly the method of weaving the parts thereof.

Figure 4 is a detail view of a portion of one of the bead rings or bands.

Figure 5 is a plan view of a portion of a spring section of modified construction in which interlaced wire strands are employed.

Figure 6 is a sectional elevation of the same, the section being taken on line 6—6 of Figure 5.

In carrying my invention into practice in the form shown in Figures 1 to 4, inclusive, I provide a woven wire outer shoe or tread 1, which may be of any of the forms in general, that is, of the clencher, straight-side, or any of the other types designed for use with different forms of rims.

The tire 1 comprises a central or tread portion 2 and side portions 3. The tread portion 2 is preferably made of woven wire of larger size or gage than the side portions 3, and said portions 2 and 3 are also preferably woven in different ways, so that the tread portion will have a centain degree of flexibility, with maximum strength and durability, while the side portions 3, while also having maximum strength and durability, will be relatively flexible to adapt the shoe as a whole to readily flex with the inner tube, as well as to permit the shoe to be properly fitted about the tube and applied to and released from the tire-carrying rim.

A preferred mode of making the tread portion 2 is to construct it of a plurality of woven or plaited strand units, each consisting of a plurality of plaited strands or units, whereby the strands are interlaced to secure strength and compactness, while permitting ample flexibility, and whereby a tread surface presenting a multitude or myriad of road gripping surfaces will be produced. As shown particularly in Figure 3, the tread portion 2 is formed, in the present instance, of three strand units 4, 5 and 6, which strand units are plaited or woven together, each of said strand units comprising three plaited or woven wire strands 7, 8 and 9. In forming this portion of the tire, the strand units are first produced by plaiting or weaving the desired number of wire strands together, and the desired number of these braided wires or units are then braided, plaited or woven together. The structure in the present instance embodies, as stated, a tread formed of three such braids or units, each composed of three braided or plaited wires, but it will be understood of course that the number of braided units employed, as well as the number of wires used in each braid, may vary as desired in the production of tires of different sizes or for different specific purposes.

The side portions or flaps 3 of the shoe are preferably made of wire strands of lighter gage than the wire strands of the tread portion, and these strands forming the said side portions or flaps are also preferably woven in a different manner from the weave of the tread portion, so that said side portions or flaps may have a greater range or greater amplitude of universal flexibility. As shown in the present instance, each side portion or flap 3 is made up of a plurality of strands of wire which are looped at regular intervals, the portions of each strand between adjacent loops thereof being engaged by loops of an adjoining strand, the weave shown being that similar to fish net weaving, although any similar type of weave may be employed. The side portions or flaps, being thus composed of wire of lighter gage than the tread wires, more or less loosely woven together, such side flaps are rendered sufficiently yielding to flex freely and universally with the inner tube, while at the same time said flaps may be easily spread apart to admit an inner tube while placing it in position, and of being pressed inwardly for ready and convenient placing of the shoe with the contained inner tube on a rim and engagement of the beads of such rim with the portions of the rim with which they interlock.

The side portions or flaps 3 are interwoven with the tread portion 2 by casting their inner longitudinal border loops about the longitudinal side or border loops of the strands of the tread portion 2, as clearly shown in Figure 3.

The proper annular form of the tire shoe or casing constructed as above described may be produced in any suitable manner. For example, a suitable length or linear portion of the completed woven material may be shaped around a proper form and the ends thereof united by welding, brazing, or by interlacing other strands therewith extending across the joint and at a suitable distance therebeyond to unite the end portions in a secure manner. Another and preferred way of making the shoe is to take a proper length of a woven tread strip 2, shape it into the proper annular form, and then unite the ends thereof by interlacing other or binding strands of wire therewith, which binding strands may be brazed or welded at points to the end of the tread 2 joined thereby, as will be readily understood. When the tread portion 2 is thus made in annular form, the side portions or aprons 3 may be woven upon the same and the terminals of the strands of the netted portions brazed, welded or otherwise suitably united to fasten them securely together.

For the purpose of strengthening the edges of the side portions or aprons 3, and limiting their distention, bead rings or bands 10 may be provided. These rings or bands may be made of wire or other suitable material, passing through and engaged by the proper loops of the netting. These rings may also serve, in conjunction with the edge loops of the portions 3, to provide bead members on the shoe for engagement with the flanges or other interlocking portions of the tire-carrying rim whereby the shoe is locked in position thereon. Each ring 10 is split at one point in its circumference and has one of its end portions formed or provided with a sleeve 11 to loosely and slidably receive its other end portion, as shown in Figure 4, making each ring expansible and contractible. This allows the edges of the side portions 3 to be properly spread for convenience in inserting or removing an inner tube and adapts them to afterwards contract to normal diameter.

The outer shoe or casing constructed as set forth may be provided with any suitable type of inner lining 12, covering its entire inner surface, to envelop the enclosed portion of the inner tube, so as to protect said tube from direct contact with the wires and prevent it from becoming chafed or otherwise injured. This inner lining 12 may be of the form shown or any other suitable form and may be made of cork, canvas, leather, of laminated or other suitable construction, impregnated or not with rubber or other binding or water-proofing materials, and such lining may be loosely fitted in position or glued, cemented or otherwise permanently fastened to the inner surface of the shoe. I do not limit myself to any particular form or type of this inner lining, as any suitable for the purpose of enclosing and protecting the inner tube may be employed.

In Figures 5 and 6 I have shown a different mode of constructing the tread portion of the tire which may be employed in lieu of that shown in Figures 1 to 4, inclusive. In this construction shown in Figures 5 and 6, 15 generally designates the tread portion which is formed of two coiled wire members 16 and 17. Normally these members are of circular form, that is, are in the shape of ordinary coiled wire springs.

These spring are brought together, side by side, with their convolutions alternating in arrangement or interlaced, after which the two springs thus joined are passed between flattening rollers or otherwise subjected to pressure, whereby they are flattened out. This produces a flat strip or band, composed of two wire members, the coils of each of which are flattened into the shape of elliptical loops extending transversely of the strip, each loop having its longitudinal edges respectively underlapping and overlapping the longitudinal edges of the adjacent loops. Also the loops of each member lie at a slight angle to the plane of the strip and are free from connection at their inner edges and joined at their outer edges by portions of the wire uniting adjacent loops, thus producing a longitudinal border edging on each member. As a result of the flattening process the loops of the two spring members under and overlie each other successively throughout the strip and are thus interlaced together so as to securely unite the members together. The construction described provides a strip which is admirably adapted to form a tread section, to the border strands of which the loops of the woven or knitted side sections 3 may be joined as previously described.

From the foregoing description, taken in connection with the drawing, the construction of my improved outer shoe or casing for pneumatic tires will be readily understood, and it will be seen that the invention provides a shoe or casing which is free from the defects of the ordinary fabric and rubber casings in that its structure, much more durable, can not be penetrated by nails, stones or other objects liable to puncture or otherwise injure the inner tube, and can not blow out. Furthermore, this construction of spring wire shoe provides a tread surface having a multitude or myriad of protecting surfaces and crossed portions, lying at transverse and diagonal angles to the line of tread, thus forming upon the tread itself an anti-skid or anti-slipping surface, rendering unnecessary the use of anti-skid chains or other auxiliary anti-skid devices to prevent skidding. It will, of course, be understood that the wires of both the tread portion 2 and the side portions 3 may be interlaced or woven as loosely or compactly as desired according to requirements.

In the appended claims I have used the terms "interlaced," "interwoven" or "woven" as defining any structure in which strands of wire are crossed and interconnected to produce meshed structural parts for the purposes described.

Having thus fully described my invention, I claim:—

1. A pneumatic tire shoe having a tread surface formed of plaited units, each unit being composed of plaited strands of wire.

2. A pneumatic tire shoe having a tread portion formed of continuous strands of woven wire, and side portions formed of continuous strands of woven wire, the meshes of the side portions being linked with the meshes of the tread portion.

3. A pneumatic tire shoe comprising a tread portion formed of a plurality of plaited wire units, each consisting of a plurality of plaited wire strands, and side portions each formed of netted wire linked to the border strands of the tread portion.

4. A tire shoe comprising a tread portion having a plurality of relatively heavy plaited wires, side portions formed of continuous looped strands of smaller gage wire, the loops of each strand interlooping with the next adjacent strand and the loops of certain of said strands being engaged with certain strands of the plaited tread portion.

5. A tire shoe comprising a tread portion formed of a plurality of relatively heavy plaited wires, side portions formed of continuous looped strands of smaller gage wire, the loops of each strand interlooping with the next adjacent strand and the loops of certain of said strands being engaged with certain strands of the plaited tread portion, and a margin wire interwoven in the outermost strands of said smaller gage wire and capable of longitudinal expansion and contraction.

In testimony whereof I affix my signature.

JOHN McFARLANE.